May 10, 1966 F. J. ARMSTRONG ETAL 3,250,396
ROTARY DISC FILTER
Original Filed May 4, 1960 3 Sheets-Sheet 1

INVENTORS
FRANCIS J. ARMSTRONG (DECEASED)
LILY L. ARMSTRONG (EXECUTRIX)
BY WALLACE F. GAYRING
John P. Murphy
ATTORNEY May 10, 1966 F. J. ARMSTRONG ETAL 3,250,396
ROTARY DISC FILTER
Original Filed May 4, 1960 3 Sheets-Sheet 2

INVENTORS
FRANCIS J. ARMSTRONG (DECEASED)
LILY L. ARMSTRONG (EXECUTRIX)
BY WALLACE F. GAYRING
John P. Murphy
ATTORNEY May 10, 1966  F. J. ARMSTRONG ETAL  3,250,396
ROTARY DISC FILTER Original Filed May 4, 1960  3 Sheets-Sheet 3

INVENTORS
FRANCIS J. ARMSTRONG (DECEASED)
LILY L. ARMSTRONG (EXECUTRIX)
BY WALLACE F. GAYRING
John P. Murphy
ATTORNEY

United States Patent Office 3,250,396
Patented May 10, 1966

3,250,396
ROTARY DISC FILTER
Francis J. Armstrong, deceased, late of Fayetteville, N.Y., by Lily L. Armstrong, executrix, Fayetteville, N.Y., and Wallace F. Gayring, Minoa, N.Y., assignors, by mesne assignments, to Ametek, Inc., New York, N.Y., a corporation of Delaware
Continuation of application Ser. No. 26,794, May 4, 1960. This application Aug. 12, 1964, Ser. No. 391,828
3 Claims. (Cl. 210—331)

This is a continuing application of copending application Serial Number 26,794, filed May 4, 1960, and now abandoned.

This invention relates to filters, and more specifically to a filter for obtaining a clear filtrate from a sludge laden solvent, the filter being of the rotary disc type.

In filter devices for sludge laden solvents and the like, it has commonly been the practice to pass the contaminated solvent into a filter casing where the solvent can circulate under pressure around a plurality of discs which are fastened to a centrally arranged hollow drainage tube, the outlet of which is connected to a suitable receptacle. As the solvent passes through the surfaces of the discs into the tube and to the outlet, dirt and sludge, along with filter aid are deposited on the discs to the point that it is necessary to remove the deposit in order to continue with the filter operation. Conventional apparatus for removing the filter cake, as the deposit is called, includes a series of scraper blades or the like which scrub the filter cake from the discs as the discs and drainage tube are rotated during the cleaning operation of the filter. This device is particularly disadvantageous in that the scrapers tend to tear or otherwise damage the filter material on the discs. To avoid damage to the material, it is necessary to space the scrapers from the disc so that only a portion of the filter cake is removed therefrom. Another type of cleaning apparatus embodies the use of high pressure streams of solvent directed at the discs for removing the filter cake to a drain sump. This is partially ineffectual in that the stream of solvent does not reach all areas of the discs. Still further types of filters employ expensive drying means for evaporating the solvent from the filter cake, drying same, then removing the cake by means of compressed air moving in a reverse direction through the discs. This requires the provision of drying equipment, compressed air equipment, and expensive valving mechanisms to supply the air through the drainage tube and filter discs in a reverse direction to the normal flow of solvent therethorugh. Much time is also consumed during the process of drying the filter cake, and special equipment must be provided to reclaim the valuable solvent from the vapors formed during the drying process.

Accordingly, it is a main object of this invention to overcome the above disadvantages by the provision of a filter which is simple in construction and which requires a minimum of associated equipment for use therewith.

Another object of this invention is to provide for the cleaning of the filter elements in a manner so as to prevent injury thereto and therefore not shorten the life of the filter elements.

A further object of the invention is to provide for the cleaning of the filter elements with a minimum of apparatus and in a short time, so that the filtering operation may be continued as soon as possible.

It is another object of the invention to provide a filter which is rugged and dependable, due to its inherent simplicity of operation.

Another object of this invention is to prevent the wearing out of parts such as seals and the like during the rotation of the filter elements.

In carrying out the objects of the invention there is provided a filter including a rotatable drainage channel having a plurality of filter elements, turning means extending through one end of the filter for rotating the filter elements, seals at the ends of the filter, and means for causing compression of the seals during the filter operation and for removal of compression of the seals during the filter cleaning operation.

The invention will be fully understood from the following detailed specification when taken with the accompanying drawings.

Figure 1:
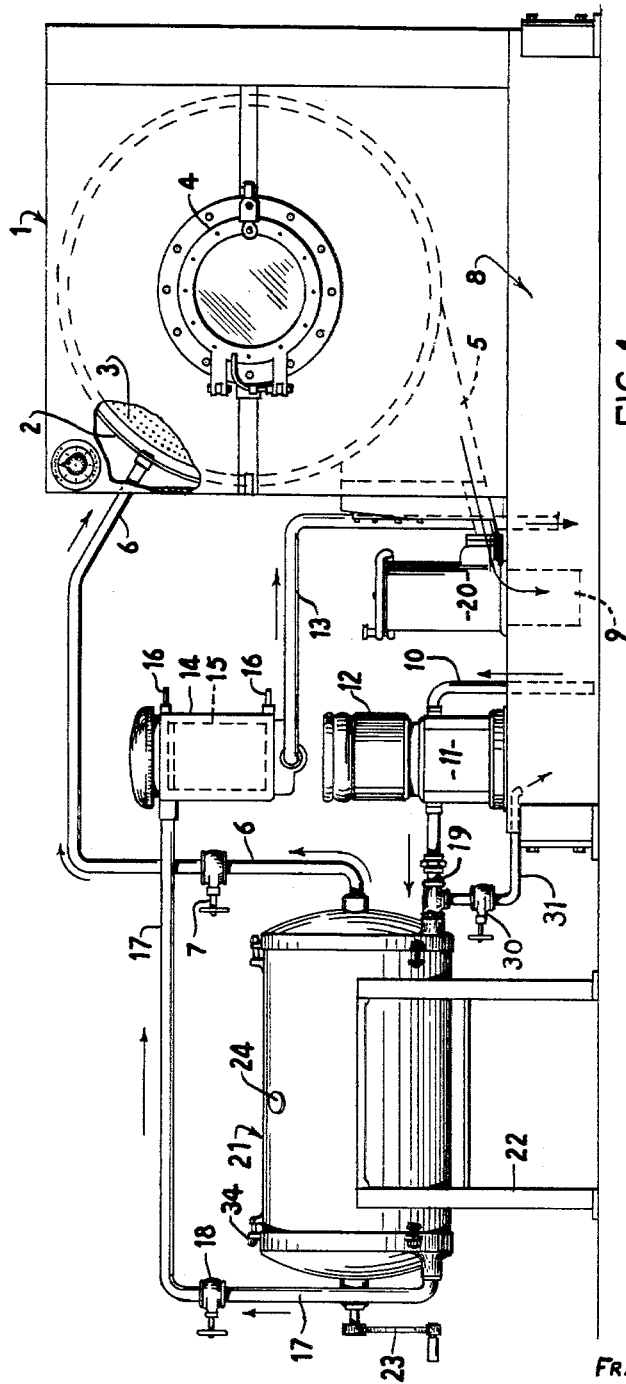
FIGURE 1 illustrates the invention, when used in a dry cleaner.

Although the filter of this invention is adaptable to a wide variety of applications, FIGURE 1 illustrates its application to a basic drycleaning plant 1. The drycleaning plant has formed within a chamber 2 in which is disposed a rotatable drum 3. Items to be cleaned are placed in the drum through a loading door 4. During the wash cycle of the machine, clean solvent enters through pipe 6 and is agitated by the drum 3. Dirt-laden solvent accummulates in the bottom 5 of chamber 2, where it stands against a valve 20. Valve 20, retaining solvent in chamber 2 during the wash cycle, releases solvent to the sump tank 8 through a bottom trap 9 thereafter by automatic means not shown. A filter 21 is provided for filtering the dirt-laden solvent for reuse by the machine. A pump 11 operated by motor 12 draws dirty solvent through a pipe 10, conveying it through an inlet 19 to filter 21, from which clean solvent is conveyed through a drainage pipe 6 into the machine. A back drain line 31 is inserted between inlet pipe 19 and the sump tank 8, and is provided with a back drain shutoff valve 30. The purpose of this back drain arrangement is for controlling the level of solvent in the filter 21 during the filtering operation thereof.

Figure 2:
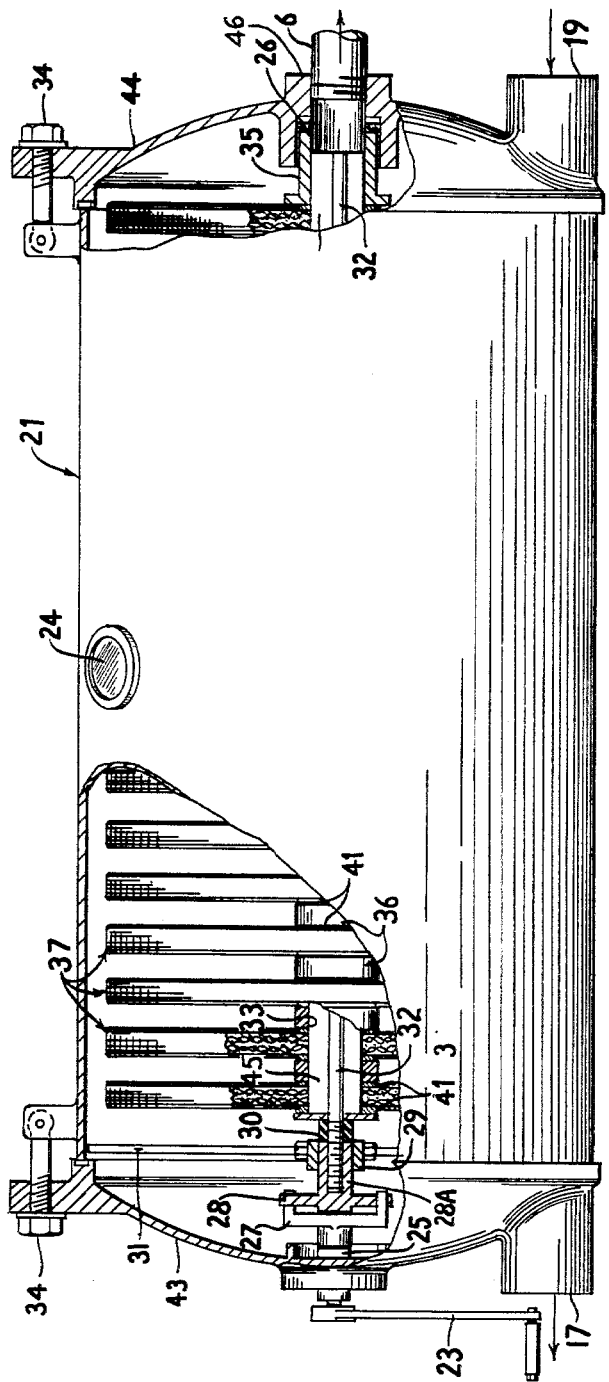
FIGURE 2 is an enlarged view of the invention, with portions cut away to clearly illustrate the features thereof.
Figure 3:
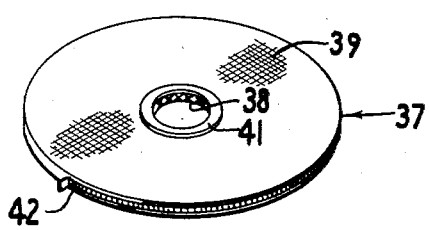
FIGURE 3 is a perspective view of a filter disc for use with the invention, showing the attachment of the filter material.

FIGURE 2 illustrates the filter 21 on a larger scale, with parts cut away. The filter 21 comprises a casing forming a closed chamber therein. The casing heads 43 and 44 may be retained by suitable means such as toggle bolts 34 or the like. A drainage channel 33 is formed axially within the casing, and is adapted to be moved axially, as will appear. Primarily, the channel 33 is formed by a plurality of filter discs 37, arranged axially within the casing of the filter 21. As FIGURE 3 illustrates, each filter disc 37 basically comprises a circular body of screen mesh or the like (see also FIGURE 4) mounted around a circular inner rim 41 and bounded by an outer rim 40. The inner rim 41 provides a continuous opening around its inner periphery. A filter cover 39, such as of fine filter cloth, is disposed over the screen body 38 and may be retained thereon by a slide fastener 42 or the like. When the filter discs 37 are arranged axially, a spacer 36 is disposed between each pair of discs so as to maintain an open space therebetween for the circulation of sludge laden solvent.

Figure 4:
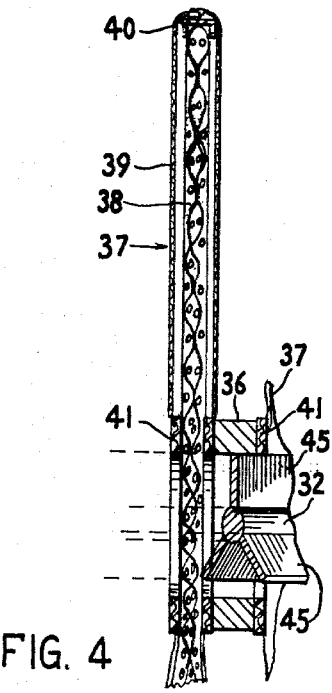
FIGURE 4 is a sectional view of a portion of the invention.
Figure 5:
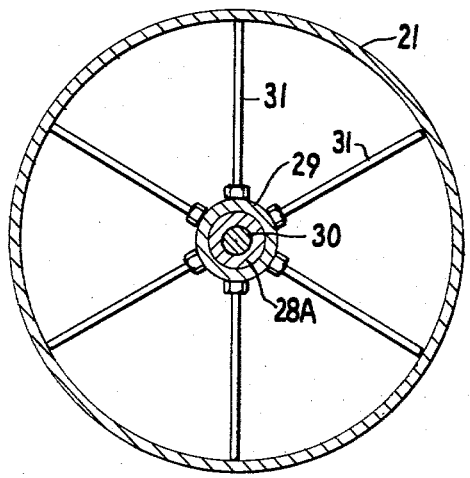
FIGURE 5 is a sectional view showing the means for supporting one end of the shaft for rotating the filter elements.
Figure 6:
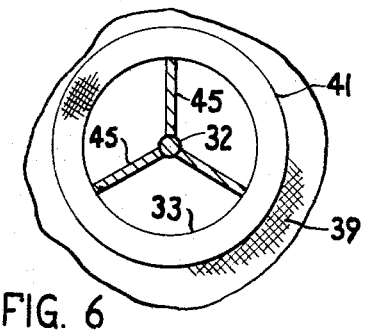
FIGURE 6 is a sectional view of the drainage channel showing the supporting means and a filter disc.

FIGURES 2, 4 and 6 show how the filter discs 37 and spacers 36 are supported in axial alignment. A shaft 32 is disposed substantially the length of the channel 33. Welded or otherwise formed on the shaft 32 are web-like vanes 45 which extend to the inner openings formed in the rims 41 and spacers 36. (In FIGURE 4 the webs 45 and shaft 32 are cut away at an angle.)

As shown in FIGURE 2, the end of the shaft 32 and webs at the outlet end of the filter 21 is welded in an encircling bushing 35, which is freely and slidably disposed in an outlet pipe hub 46 in the casing head 44 and adapted to bear against a seal 26 mounted in the outlet pipe hub. It will also be noted that the rim 41 of the last filter disc 37 bears against the hub 35. At the other end of the shaft 32, the shaft is threaded and a nut 30 is disposed thereon against a plate which bears against the rim 41 of the first filter disc 37. A threaded engager 28A is rotatably mounted on the threaded portion of the shaft 32 at the end of the shaft away from the nut 30. The engager 28A has arms 28 extending therefrom at one end, as will appear.

In order to support the end of the shaft 32 on which the engager 28A is mounted, there is provided a bushing 29 which is disposed on the engager 28A so that the engager can turn freely therein. Extending from the bushing 29 are arms 31, the outer ends of which bear against the wall of the casing of the filter 21. Since the supporting device comprising the bushing 29 and arms 31 does not turn within the filter 21, the engager 28A can turn freely and slide within the bushing 29, thus supporting one end of the shaft 32 and webs 45. This also, obviously, supports the assembly of filter disc 37 at that end of the filter 21. As has been explained above, the other end of the assembly of filter discs 37 and the shaft 32 are supported by the bushing 35.

Mounted through the casing head 43 is a crank 23, of any suitable construction. The crank 23 is fastened to a shaft on the inner end of which is a yoke 27. It will be noted in FIGURE 2 that the arms of the yoke 27 are adapted to engage and disengage the arms 28 of the engager 28A when the crank 23 is turned. It will also be seen that the inner end of the shaft of the yoke 27 and crank 23 is in axial alignment with the end of the body of the engager 28A, and is further adapted to be abutted thereby. A seal 25 is located between the yoke 27 and the casing head 43 for sealing the opening through the head 43, as will appear.

It is also noted that one or more sight glasses 24 may be provided in the casing of the filter to permit observation of the accummulation of muck and sludge on the filter discs 37 as the filtering operation is carried out.

During the filtering cycle of the filter 21 or during the period when dirty solvent enters the chamber of the filter through the inlet 19; the dirty solvent passes through the filter covers 39 and screen mesh 38 of the filter discs 37, into the channel 33 through the opening in the rim 41 and is outletted through the pipe 6 to the drycleaning machine. It will be obvious to one skilled in the art that at this time, all openings from the filter 21 should be sealed, inasmuch as the solvent is pumped thereinto under pressure. The pipe 17 is sealed by valve means. The seals 25 and 26 should be employed to seal the opening through the casing head 43 for the shaft of the crank 23, and to seal the slight opening between the chamber of the filter 21 and the outlet pipe 6, respectively.

During the washing cycle, that is, during the cycle during which the filter muck and cake which has accummulated on the filter discs 37 is being washed into the subfilter 14, it is desirable to rotate the filter discs 37 while the solvent is flowing through the filter 21 from the inlet 19 to the outlet 17, so that all of the areas of the filter discs 37 are washed by the solvent.

It will be apparent to one skilled in the art that the novel arrangement of components as described hereinabove provides for the employment of the seals 25 and 26 during the filtering cycle, and for the disengagement of the seals and the rotation of the assembly of filter discs during the filter washing operation. Let it therefore be assumed that the shaft 32 is provided with a conventional right-hand thread. Thus, when the crank 23 is turned in a clockwise direction, the arms of the yoke 27 engage the arms of the engager 28A, causing the engager 28A to be advanced on the threads of the shaft 32. This action moves the body of the engager 28A out of contact with the body of the yoke 27 FIGURE 2, and also advances the body of the engager 28A into engagement or contact with the nut 30. It is obvious that there is no longer any axial pressure of the body of yoke 27 against the seal 25; nor is there any axial pressure through the assembly of discs against the bushing 35 and seal 26 at the other end of filter 21. The assembly of discs, along with shaft 32 and vanes 45, is free to be rotated within the chamber of filter 21. Since the body of the engager 28A has been moved to a point in contact with the nut 30, continued turning of crank 23 in a clockwise direction causes yoke 27 to turn the engager 28A, thus causing the entire assembly within the filter 21 to rotate. To control the solvent level in filter 21, the operator drains the solvent to half-full in the filter by means of back drain valve 30 and pipe 31; then closes valves 30 and 7 and opens valve 18. The solvent flow is then from line 19 to line 17; and the level is maintained at approximately half-full due to an air head which is formed within the filter 21. Filter cake and sludge are removed from the discs 37 by washing, agitation and scrubbing by filter cake particles in motion in the agitated solvent, and are then conveyed to the subfilter 14.

When it is observed through sight glass 24 that the discs 37 are clean, the operator reverses the direction of crank 23 to a counterclockwise direction, reversing the direction of yoke 27 until the arms thereof engage arms 28 of engager 28A, moving the same counterclockwise. Thus the engager 28A is backed off along the threaded shaft 32 away from nut 30 (while rotation of the disc 37 assembly ceases) until the body of engager 28A comes into contact with the body of yoke 27. This forces yoke 27 axially towards casing head 43, compressing seal 25 between yoke 27 and casing head 43, sealing the hole therethrough through which the shaft of crank 23 extends against the possible leakage of any solvent.

In a similar manner, the axial bearing action of the engager 28A against the yoke 27 also forces the assembly of filter discs 37 to move axially in an opposite direction to force the bushing 35 to compress the seal 26 in a similar manner, thus sealing the opening into pipe 6 against any possible leakage from the chamber of the filter 21. Therefore, when the crank 23 has been rotated in a counterclockwise direction to its limit of travel, the seals 25 and 26 are employed by compression to seal the openings, and the assembly of filter discs 37 is held against rotation. At this time, solvent enters the filter 21 through the inlet 19 and passes through the filter discs 37 and out through the pipe 6, the outlet 17 being closed by means of the valve 18.

It is to be pointed out that, during the filter-cleaning operation, the sludge-laden solvent being pumped out through the pipe 17 is conveyed to a conventional subfilter 14. This filter 14 may include a filter screen or basket 15 and connections 16 for a heating coil or the like. Thus, the basket 15 catches the sludge while clean solvent is returned to the sump 8 through the pipe 13. However, when valve 18 is closed and the filter is not being cleaned, the subfilter 14 is heated as by steam purging through the connections 16 for driving any solvent out of the filter cake contained in the basket 15 and thus drying the filter cake. The basket 15 may then be emptied into a waste receptacle, and the greatest amount of solvent is reclaimed for reuse.

Those skilled in the art will readily appreciate that an important feature is thus presented. During the backwash operation for removing filter cake from the discs 37, the pressure on the outside of each disc 37 is the same as that on the inside of the disc. This is due to the fact that there is no appreciable flow of solvent through the disc since the outlet pipe 6 is shut off. Thus, there is no pressurized backflow of solvent to force the filter cake from the filter discs 37, but a washing action which is combined with the rotating of the discs 37 by the handle 23 while the solvent flows around and through the discs accomplishes a complete removal of the filter cake. It will also be seen that the filter cloth 39 of the discs 37 is not worn out by means of sharp scrapers or by constant inflation from pressure for removing the filter cake.

Further, there is no damage to the end seals 25 and 26 since they are not under any compression during the washing operation and while the disc assembly is being rotated. The seals 25 and 26 are compressed only during the filtering operation.

Thus the invention provides for a filter requiring only a single piece of associated equipment for the complete reclaiming of all of the solvent. During the backwash operation there is no damage to the filter discs because they are subjected only to a wash of the solvent, whereby the backwash operation is completed in a short time. Due to its inherent simplicity, the filter is dependable and rugged, assuring a trouble-free operation. Seals are relieved of any pressure during the period when any parts are being moved in the filter, assuring a long life. Thus, down-time of the filter, and the associated loss of revenue by the operator are kept at a minimum.

One embodiment of the invention having been shown and described for the purpose of illustration only, it is to be understood that the invention is not to be limited to the form shown, but is to be interpreted as fairly falls within the scope of the appended claims.

What is claimed is:

1. A filter comprising a casing, an outlet formed at one end of said casing, a pair of spaced centrally disposed bearing means mounted in the opposite ends of said casing, one of which bearing means is adjacent said outlet, an assembly of filter discs mounted axially in said casing, a channel formed through said discs to said outlet, a shaft mounted in said channel for supporting said assembly and having one end operatively disposed for axial sliding movement in the bearing means adjacent said outlet, the other end of said shaft being extended through the one of said pair of bearing means remote from said outlet and having threads on said extended end, a rotatable crank means extended through the end of the casing opposite the end having the outlet and to a spaced position adjacent the threaded end of said shaft, an engager threadably disposed on said threaded shaft end and axially slidably disposed in said remote bearing means, said engager on rotation in one direction being threadably movable axially outwardly along said threaded shaft end into an abutting position against said crank means and effective on continued rotation to thrust the end of said shaft remote from said crank means into a fluid tight seal about said outlet during the normal operating cycle of said filter, and on rotation in a reverse direction being threadably movable axially inwardly along said threaded shaft end into an abutting position against said shaft mounted filter disc assembly and effective on continued rotation to break said fluid tight seal by withdrawal of said shaft from about said outlet permitting rotation of said filter disc assembly in unison with said shaft during the filter cleaning cycle of said filter, and first and second engageable means fixedly mounted on the adjacent ends of said crank means and said engager, respectively, for imparting rotational movement of said crank means to said engager after an initial freely rotatable traverse of said crank means which is effective to dislodge the engager from said engager positions of abutment.

2. A filter as claimed in claim 1 wherein said first engageable means includes an axially extending member and said second engageable means includes a radially extending member disposed in the path of rotation of said axially extending member, the engagement of said members being made after an initial freely rotatable traverse of said crank means resulting in initial striking contact between said members which is effective to dislodge the engager from said engager positions of abutment.

3. A filter comprising a casing, an outlet formed at one end of said casing, a pair of spaced centrally disposed bearing means mounted in the opposite ends of said casing, one of which bearing means is adjacent said outlet, an assembly of filter discs mounted axially in said casing, a channel formed through said discs to said outlet, a shaft mounted in said channel for supporting said assembly and having one end operatively disposed for axial sliding movement in the bearing means adjacent said outlet, the other end of said shaft being extended through the one of said pair of bearing means remote from said outlet and having threads on said extended end, a rotatable crank means extended through the end of the casing opposite the end having the outlet and to a spaced position adjacent the threaded end of said shaft, an engager threadably disposed on said threaded shaft end and axially slidably disposed in said remote bearing means, said engager on counterclockwise rotation being threadably movable axially outwardly along said threaded shaft end into an abutting position against said crank means and effective on continued rotation to thrust the end of said shaft remote from said crank means into a fluid tight seal about said outlet during the normal operating cycle of said filter, and on rotation in a clockwise direction being threadably movable axially inwardly along said threaded shaft end into an abutting position against said shaft mounted filter disc assembly and effective on continued rotation to break said fluid tight seal by withdrawal of said shaft from about said outlet permitting rotation of said filter disc assembly in unison with said shaft during the filter cleaning cycle of said filter, a yoke fixedly mounted on the extended end of said crank means including a pair of spaced axial projections extending the length of the axial path of travel permitted said engager between said crank means and said shaft mounted filter disc assembly, and a radially extending arm fixedly mounted on said engager in the path of rotation of said yoke axial projections for imparting rotational movement of said crank means to said engager on engagement of said yoke axial projections with said engager arm, said engagement being made after an initial substantially 180-degree freely rotatable traverse of said crank means resulting in initial striking contact of said yoke axial projections against said engager arm which is effective to dislodge the engager from said engager positions of abutment.

References Cited by the Examiner

UNITED STATES PATENTS 2,079,755   5/1937   Wood _____ 210—236

FOREIGN PATENTS 1,479   12/1863   Great Britain.

REUBEN FRIEDMAN, *Primary Examiner.*

F. MEDLEY, *Assistant Examiner.*